United States Patent [19]

Sorlie et al.

[11] Patent Number: 4,471,975
[45] Date of Patent: Sep. 18, 1984

[54] COUNTERWEIGHT AND AXLE MOUNTING ARRANGEMENT

[75] Inventors: Kjell Sørlie, Tønsberg, Norway; Daniel L. Ervin, Mentor, Ohio

[73] Assignee: Towmotor Corporation, Mentor, Ohio

[21] Appl. No.: 451,213

[22] PCT Filed: Nov. 8, 1982

[86] PCT No.: PCT/US82/01571
§ 371 Date: Nov. 8, 1982
§ 102(e) Date: Nov. 8, 1982

[87] PCT Pub. No.: WO 84/01754
PCT Pub. Date: May 10, 1984

[51] Int. Cl.$^3$ .............................................. B62D 25/12
[52] U.S. Cl. .................................. 280/759; 187/9 R; 212/195; 414/613
[58] Field of Search ................ 280/759; 414/613, 719; 187/9 R; 212/195

[56] References Cited

U.S. PATENT DOCUMENTS

| | | | |
|---|---|---|---|
| 2,561,300 | 7/1951 | Walker | 214/113 |
| 2,925,149 | 2/1960 | Hughson | 280/759 |
| 3,888,507 | 6/1975 | Berghausen | 280/759 |
| 4,090,579 | 5/1978 | Stedman | 280/759 |

FOREIGN PATENT DOCUMENTS 2658969  6/1978  Fed. Rep. of Germany .

Primary Examiner—Richard A. Bertsch
Attorney, Agent, or Firm—Alan J. Hickman

[57] ABSTRACT

This invention relates to a mounting arrangement (47) for pivotally connecting a counterweight (18) and a steering axle assembly (30) to a trunnion shaft (28) of a vehicle (10) which eliminates the problems of removal of both of the counterweight (18) and the steering axle assembly (30) when only one needs to be removed, serviceability, accessibility, visibility, strength and stability. The mounting arrangement (47) has a carrier (52) having first and second spaced apart support portions (54,56) and being pivotally mounted on the trunnion shaft (28), the steering axle assembly (30) is mounted on the first support portion (54) and oriented in a direction normal to a longitudinal frame axis (22), the counterweight has an upper deck member (48) and a rear slab member (50), the rear slab member (50) is releasably connected to each of the carrier (52) and the steering axle assembly (30) and the upper deck member (48) is fastened to the carrier (52) for maintaining the rear slab member (50) in connection with the carrier (52) and the steering axle assembly (30). Thus, the mounting arrangement eliminates the problems of serviceability, accessibility, visibility, strength and stability. The mounting arrangement is particularly useful in a material handling vehicle.

13 Claims, 3 Drawing Figures

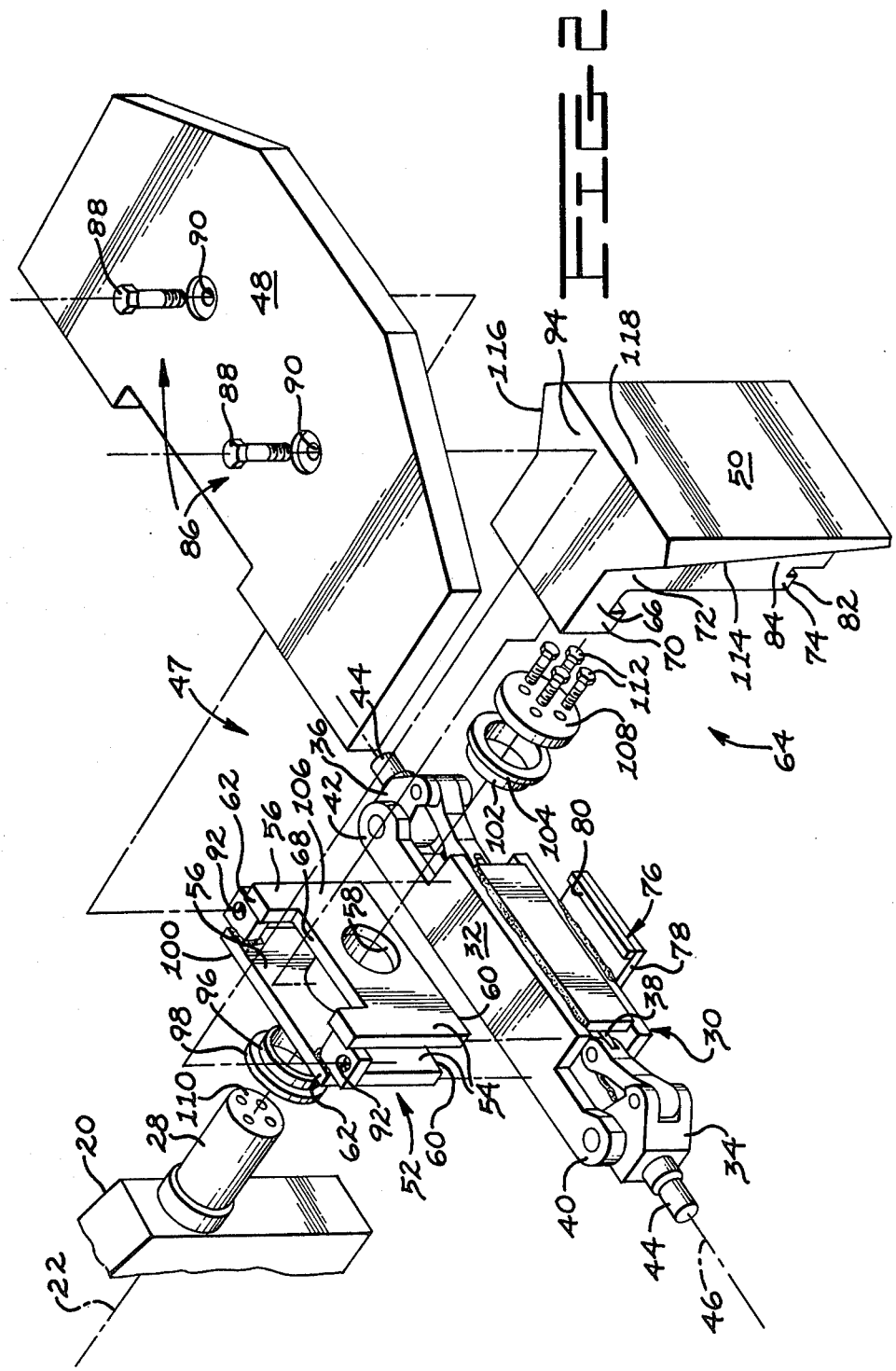

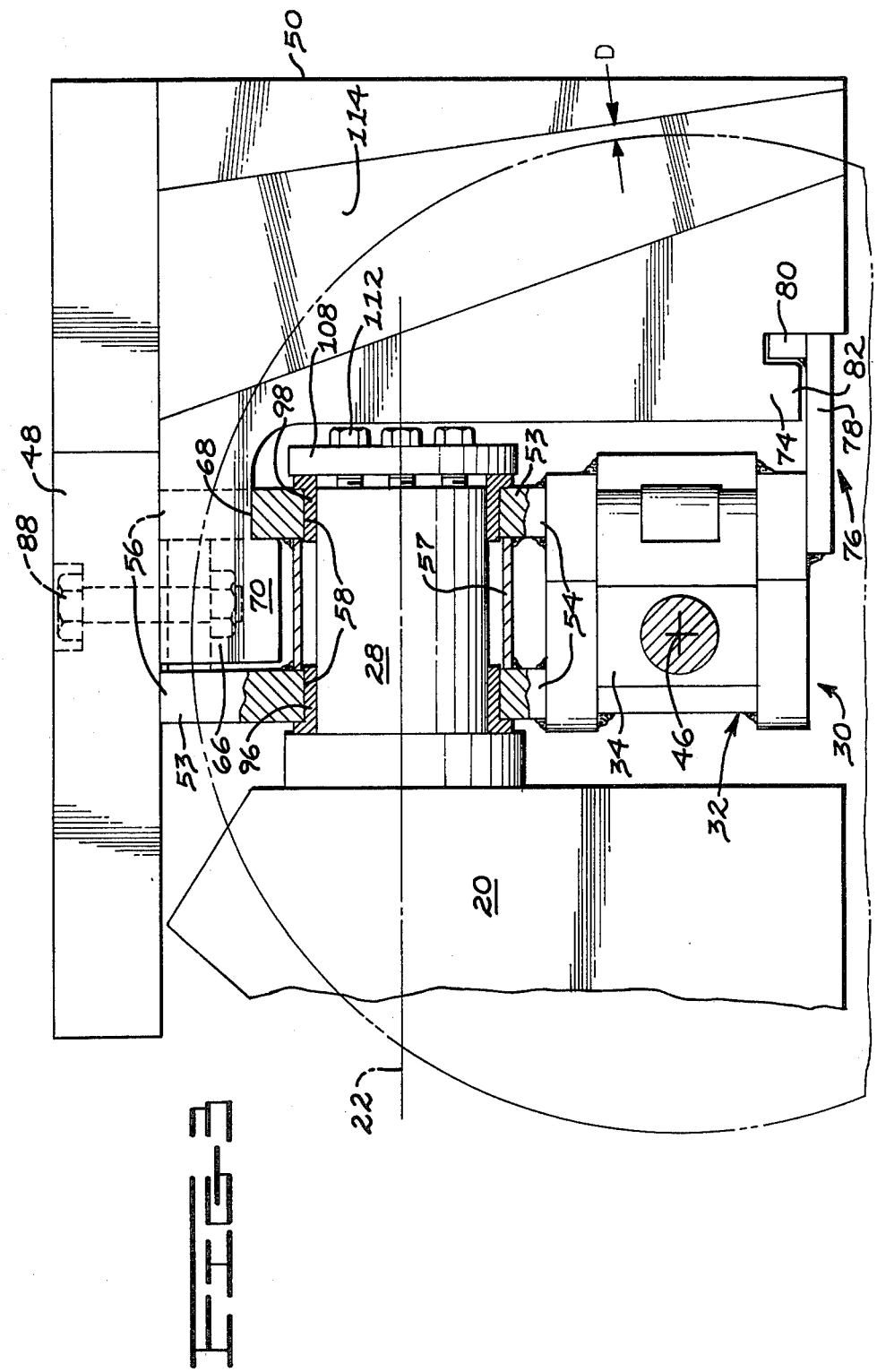

COUNTERWEIGHT AND AXLE MOUNTING ARRANGEMENT

DESCRIPTION

1. Technical Field

This invention relates to a counterweight and axle mounting arrangement and more particularly to a mounting arrangement having a carrier, the carrier has a first support portion and is pivotally mounted on a trunnion shaft of a vehicle frame, the axle is mounted on the first support portion and the counterweight has an apparatus for releasably connecting a rear slab member thereof to each of the carrier and axle and a fastener for connecting an upper deck member of the counterweight to the carrier which maintains the releasable connecting means in connection with the carrier and the steering axle assembly.

2. Background Art

Counterweights and steerable wheels which are pivotally connected to the frame of a vehicle are well known in the art. Typically, the counterweight, which is of a unitary one-piece construction, is pivotally mounted to the frame of a vehicle by a trunnion shaft. The steerable wheels are mounted on the counterweight and pivotally movable with the counterweight. An example of this type of arrangement is shown generally in U.S. Pat. No. 2,561,300 dated July 17, 1951 to D. N. Walker.

One problem created by such an arrangement wherein the steerable wheels are mounted on the counterweight, involves the inability to remove the counterweight from the vehicle without removing the steerable supporting wheels. Thus the vehicle would have to be supported at the counterweighted end thereof by a device, for example, a jack which renders the vehicle immobile and increases complexity and flexibility during assembly and disassembly of a counterweight from the frame. Conversely in order to remove the steerable wheels and supporting mechanism from the vehicle frame, the counterweight must also be removed to provide access for removal of the steerable wheels and their associated mounting members.

Lift trucks are manufactured in an assortment of weight capacities for lifting different sized loads. Often a common frame is provided and the load capacity is varied by changing the counterweight size. When the axle assembly is connected to the counterweight, the vehicle manufacturer must warehouse the vehicles without the axle assembly and counterweight, or with a counterweight of a preselected size or a preselected inventory volume in each of the counterweight sizes. If stored without the counterweight and steer axle, movement between stored locations becomes complicated and time consuming. If stored with a single preselected sized counterweight, replacement thereof, by a different capacity counterweight as demanded by order is frequently required. If stored in each of the different available capacities, the warehouse space required increases substantially.

Usually, the counterweight is mounted on the trunnion shaft by a bearing arrangement. The bearings are mounted directly on one of the counterweight or on the trunnion shaft and directly engageable with the other of the trunnion shaft and counterweight only after the counterweight is mounted on the trunnion shaft. Mounting of the counterweight on the shaft while maintaining the bearing arrangement in place and undamaged is quite difficult due to its massive size and weight thereof. Also, this massive integral one-piece counterweight, in itself is difficult to handle and requires special equipment for removal and installation purposes.

Another problem related to the above-mentioned counterweight and steerable wheel mounting arrangement relates to the counterweight construction. When the counterweight is utilized as a structural support member for connecting the wheels to the vehicle frame it must be made of a high strength material and designed so as to provide adequate structural integrity. This adds to the cost and complexity of the counterweight.

The present invention is directed to overcoming one or more of the problems as set forth above.

DISCLOSURE OF THE INVENTION

In one aspect of an embodiment of the present invention, a mounting arrangement for pivotally connecting a counterweight and steering axle assembly to a frame of a vehicle is provided which includes a carrier having a first support portion and is pivotally mounted on a trunnion shaft connected to the frame of the vehicle, an axle beam of the steering axle assembly is mounted on the first support portion of the carrier, a releasable connecting apparatus releasably connects a rear slab member of the counterweight to each of the carrier and axle beam, and a fastening arrangement connects an upper deck member of the counterweight to the carrier for maintaining the releasable connecting apparatus in connection with said carrier and said axle beam.

In another aspect of an embodiment of the present invention, a mounting arrangement is provided for independently connecting a counterweight and an axle assembly to a trunnion shaft of a vehicle frame for pivotal movement about the trunnion shaft and permitting independent removal of at least one of the counterweight and axle assembly therefrom.

This permits ease of assembly and disassembly of the counterweight assembly and serviceability, ability to store the vehicle without a counterweight thereon and ability to easily transport the vehicle under its own power and without a counterweight.

The counterweight, not being a structural member, permits use of lower quality material, which reduces cost and complexity.

BRIEF DESCRIPTION OF THE DRAWINGS

FIG. 2 is a diagrammatic isometric exploded view of the mounting arrangement showing the counterweight, steer axle assembly, and mounting componentry in greater detail; and FIG. 3 is a diagrammatic side elevational view of the rear end portion of the vehicle showing in even greater detail the counterweight and steer axle mounting arrangement, with portions broken away for better clarity.

BEST MODE FOR CARRYING OUT THE INVENTION

Figure 1:
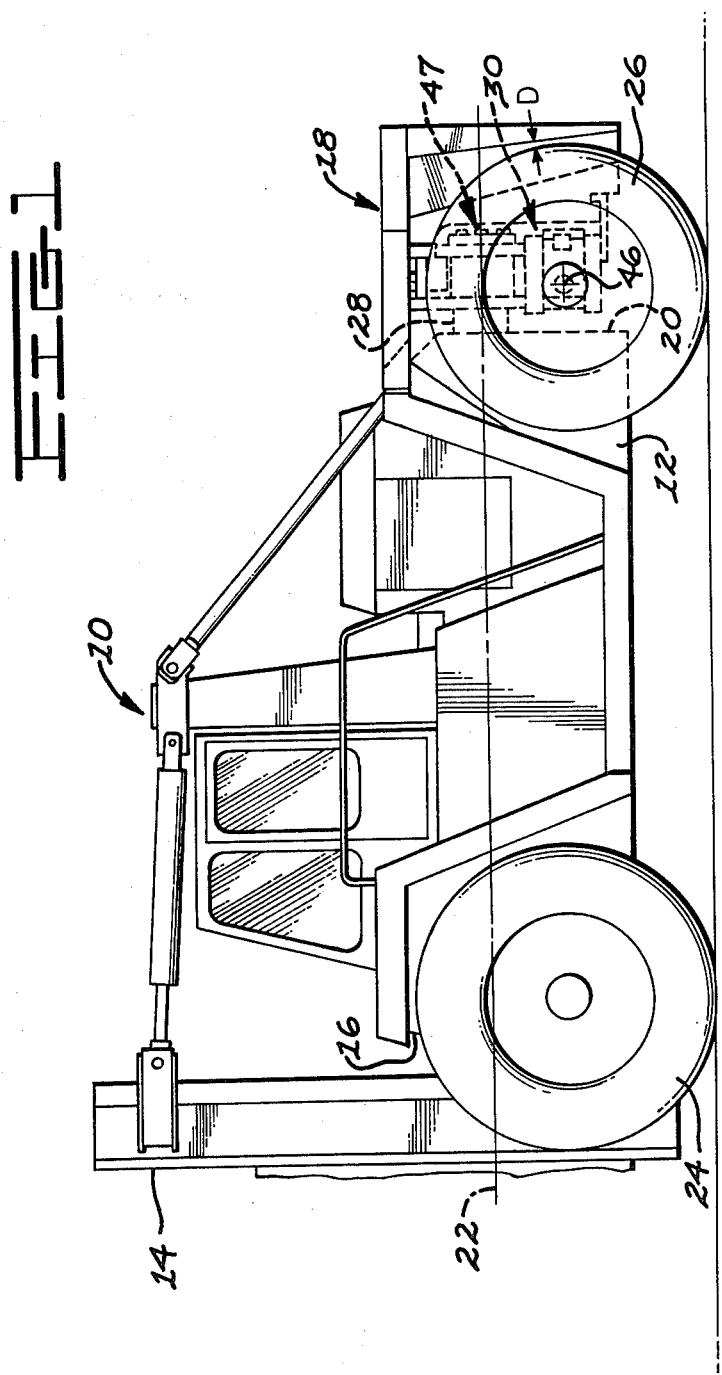
FIG. 1 shows a diagrammatic side elevational view of a lift truck vehicle showing the counterweight and steer axle mounting arrangement of the subject invention.

A vehicle 10, such as a lift truck is shown in the drawings. The vehicle 10 has a frame 12, a lift mast 14 mounted on a front end 16 of the frame 12 and a counterweight 18 mounted on a rear end portion 20 of the frame 12. The frame 12 has a longitudinal frame axis 22 which is located between opposite sides of the vehicle frame and extends in a horizontal direction the full length of the vehicle. A front pair of wheels 24 are connected to the vehicle frame 12 adjacent the front end 16 thereof and drivingly connected to a prime mover (not shown). A rear pair of wheels 26 are mounted on the rear end portion 20 of the frame 12 and pivotally actuatable for steerably guiding the vehicle.

A trunnion shaft 28, having a elongated cylindrical shape is connected to the rear end portion 20 of the frame 12 and extends from the rear end portion in a direction towards the counterweight and along the frame axis 22.

A steering axle assembly 30 having an elongate, preferably box section axle beam member 32, first and second steering knuckles 34 and 36 and a linear motor 38 is provided to steerably mount the rear wheels 26 on the vehicle frame 12. The first steering knuckle 34 is pivotally connected to one end 40 of the axle beam and the second steering knuckle 36 is pivotally connected to the opposite end 42 of the axle beam. The first and second steering knuckles each have an axle shaft 44 extending outwardly therefrom for rotatably mounting a respective one of the rear pair of wheels 26. The axle shafts are axially aligned with one another and define a longitudinal beam axis 46.

A mounting arrangement 47 is provided for independently pivotally connecting the counterweight 18 and steering axle assembly 30 to the trunnion shaft 28. The counterweight 18 has an upper deck member 48 and a rear slab member 50. The upper deck member 48 and rear slab member 50 are separate members constructed of either a low grade iron or steel so as to facilitate ease of handling and result in a less expensive, less complex construction. The upper deck member 48 is preferably a truncated rectangular shaped plate.

The mounting arrangement 47 has a carrier 52, which may be fabricated of several parts or formed in one piece, having a pair of spaced apart rectangular plates 53 defining first and second spaced apart support portions 54 and 56. A tube 57 located between the plates is connected to each of the plates, interconnects the plates and maintains them at a preselected spaced apart distance. A bore 58 is disposed in the pair of plates and opens in the tube 57. The first support portion 54 extends to a location below the bore 58 and the second support portion 56 extends to a location above the bore 58. The first support portion 54 has a first support surface 60 at its extreme lower end and the second support portion 56 has a second support surface 62 at its extreme upper end. The first and second support surfaces 60 and 62 are oriented to face in opposite directions and parallel to one another. The bore 58 is located between the first and second support surfaces 60 and 62 and parallel to both of said surfaces.

Means 64 for releasably connecting the rear slab member 50 to each of the carrier 52 and axle beam 32 is provided. The connecting means 64 includes a first hook member 66 which is connected to the rear slab member 50 and engageable in a cutout 68 disposed in the second support portion 56 of one of the plates 53 of the carrier 52. More specifically, the first hook member 66 has an end portion 70 which is nested in the cutout 68 and in engagement with the second support portion 56 of the carrier 52. The first hook member 66 is preferably connected to an upper end portion 72 of the rear slab member 50.

The connecting means 64 further includes a second hook member 74 and a beam hook member 76. The second hook member 74 is hookingly contactably engageable with the beam hook member 76. The beam hook member 76 has a first plate portion 78 and a second plate portion 80. The first plate portion is connected to the axle beam member 32 and extends therefrom in a direction parallel to the longitudinal frame axis 22 and towards the rear slab member 50. The second plate portion 80 is connected to the first plate portion 78 and extends therefrom in a direction normal to and towards the longitudinal frame axis 22. The second hook member 74 has an end portion 82 which is connected to the rear slab member 50 and extends therefrom in a direction normal to and away from the longitudinal frame axis 22. Preferably, the second hook member is connected to a lower end portion 84 of the rear slab member 50.

It is to be noted that the beam member 32 is connected to the first support surface 60 of the first support portion 54 of carrier 52, such as by welding. However, other methods of fastening the carrier's second support portion to the axle beam such as by bolting and the like should be considered appropriate especially if the steering axle assembly 30 is to be removed from the carrier without removal of the counterweight 18.

Means 86 for fastening the upper deck member to the carrier 52 and for maintaining the releasable connecting means 64 in connection with the carrier 52 and the axle beam 32 is provided. The fastening means 86 includes a plurality of fasteners 88 which are disposed in a respective plurality of apertures 90 in the upper deck member 48 and screwthreadably engaged in a plurality of tapped holes 92 in the carrier 52. The upper deck member 48 is supportingly positioned on the second support portion 56 of the carrier 52 and retained thereon by said fasteners 88. Since the upper deck member 48 is adjacent the rear slab member 50 in an overlying manner, elevational movement of the rear slab member is restricted to a slight amount or preferably none since an upper end 94 of the rear slab member is contactable or in contact with the upper deck member 48. Therefore, to remove the rear slab member 50 from the carrier 52 and steer axle assembly 30 one must first remove the upper deck member 48 in order to release the first hook member 66 from disposition in the cutout 68 and from engagement with the second support portion 56 of the carrier 52, and the second hook member 74 from engagement with the beam hook member 76.

The carrier 52 is pivotally mounted on the trunnion shaft in the following manner. A first bearing 96, which is preferably of the sleeve type, having a flange 98 is securely positioned in the bore 58 with the flange 98 contactably engaged with a first end 100 of the carrier. A second bearing 102, which is also of the sleeve type, has a flange 104. The second bearing 102 is securely mounted in the bore 58 of the carrier 52 adjacent a second end 106 of the carrier with the flange 104 contactable therewith. The carrier 52 with the bearings secured therein is mounted on the shaft with the first 96 and second 102 bearings and the carrier 52 being rotatable relative to the shaft. A retainer 108, which is preferably in the form of a cylindrical disc, is mounted on an end 110 of the trunnion shaft 28 in any suitable manner, such as by a plurality of bolts 112. The retainer is contactably engageable with the flange 104 of the second bearing 102 so as to retain the carrier on the shaft 28 and prevent axial movement of the carrier 52 thereon.

It is to be noted that the axle beam member 32 is oriented on the carrier so that the longitudinal beam axis 46 is normal to the longitudinal frame axis 22 and spaced beneath the bore 58 of the carrier 52. Therefore, pivotal movement of the carrier 52 about the trunnion shaft 28 will be observed as suspended oscillating movement of the steering axle assembly 30 and the counterweights 18.

The rear slab member 50 of the counterweight 18 has first and second fender portions 114 and 116 and a middle elongate portion 118. The middle elongate portion is oriented substantially normally to the longitudinal frame axis and extends in a passing relationship with the trunnion shaft 28, the carrier 52 and steering axle assembly 30 from damage due to contact with external obstacles and obstructions. The fender portions 114 and 116 and the upper deck member 48 are positioned relative to the steerable rear vehicle wheels 26 in an overlying manner therewith at a preselected minimum distance "D" therefrom. This clearance "D" is substantially less than normally provided in a vehicle where the counterweight is rigidly affixed to the frame and the wheels 26 are pivotally oscillatably movable relative to the counterweight. Since the relationship between the wheels and the counterweight always remains the constant, due to the movement of both the wheels and counterweight together, this small distance is permissible. Also this reduced clearance enables the counterweight to be lower relative to the ground and vehicle frame and thereby improve operation visibility and vehicle stability due to a lower center of gravity.

INDUSTRIAL APPLICABILITY

In operation and with reference to the drawings, the arrangement for pivotally connecting the counterweight 18 and steering axle assembly 30 to the trunnion shaft 28 which is cantileverly connected to the rear end portion 20 of vehicle frame as previously described permits assembly and disassembly of either one of the counterweight 18 and steering axle assembly 30 thereon and therefrom without requiring this assembly of the other. Since the steering axle assembly 30 and the counterweight 18 are each secured to the carrier 52 either one may be removed without removal of the other.

Since the counterweight 18 is comprised of two separate parts, the upper deck member 48 and rear slab member 50, removal and installation thereon is simplified due to the reduction in the total mass of the counterweight.

The first 66 and second 74 hook members of the rear slab member permits mounting of the rear slab member on both the carrier 52 and the steering axle assembly 30 simply by hooking it thereon. Placing the upper deck member 48 on the carrier 52 and securely fastening it thereto results in retention of the rear slab member 50 in hooking engagement with the carrier and the steering axle assembly 30.

Since the counterweight 18 functions only as a weight and not a structural portion of the vehicle's steering axle suspension system, the loads placed on the steering axle are transferred directly to the frame via the carrier 52. Also, the counterweight 18 may be removed from the vehicle 10 while maintaining the steering axle assembly 30 in connection with the vehicle frame 12 for supporting the vehicle 10 and permitting movement of the vehicle under its own power.

Finally, the clearance between the rear slab member 50 and upper deck member 48 and the steerable rear vehicle wheels 26 may be kept at a minimum since the entire counterweight 18 and steering axle assembly pivotally oscillate with the carrier and thereby maintain this constant clearance while permitting the axle assembly 30 to oscillate for improved ride and vehicle stability and operator visibility.

In view of the foregoing, there is provided a mounting arrangement for a trunnion mounted counterweight and steering axle which eliminates the aforementioned problems in a unique and inventive manner.

Other aspects, objects and advantages of the invention can be obtained from a study of the drawings, disclosure and appended claims.

We claim:

1. In a vehicle (10) having a frame (12), said frame having a rear end portion (20) and a longitudinal frame axis (22), a trunnion shaft (28) mounted on the rear end portion (20) of the frame (12) and projecting in a rearward direction along said longitudinal frame axis (22), the improvement comprising:

a steering axle assembly (30) having an axle beam (32);

a counterweight (18) having an upper deck member (48) and a rear slab member (50);

a carrier (52) having first and second spaced apart support portions (54,56) and being pivotally mounted on said trunnion shaft (28); said axle beam (32) being mounted on said first support portion (54);

means (64) for releasably connecting the rear slab member (50) to said carrier; and means (86) for fastening the upper deck member (48) to said second support portion (56) and maintaining the releasable connecting means (64) in connection with said carrier (52).

2. In a vehicle (10) having a frame (12), said frame having a rear end portion (20) and a longitudinal frame axis (22), a trunnion shaft (28) mounted on the rear end portion (20) of the frame (12) and projecting in a rearward direction along said longitudinal frame axis (22); the improvement comprising:

a steering axle assembly (30) having an axle beam (32) and a longitudinal beam axis (46);

a counterweight (18) having an upper deck member (48) and a rear slab member (50);

means (47) for independently connecting each of said counterweight (18) and said axle beam (32) to said trunnion shaft (28) for pivot movement about said longitudinal frame axis (22) and permitting independent removal of at least one of said counterweight (18) and axle assembly (30);

said independent connecting means (47) includes, a carrier (52) having first and second spaced apart support portions (54,56) and being pivotally mounted on said trunnion shaft (28), said axle beam (32) being mounted on said first support portion (54) and said beam axis being oriented normal to said longitudinal frame axis (22);

means (64) for releasably connecting the rear slab member (50) to each of said carrier (52) and said axle beam (32); and means (86) for fastening the upper deck member (48) to said carrier (52) and maintaining the releasable connecting means (64) in connection with said carrier (52) and said axle beam (32).

3. The vehicle (10) as set forth in claim 2 wherein said releasable connecting means (64) includes;
   a first hook member (66) having an end portion (70) and being connected to the rear slab member (50);
   a cutout (68) disposed in the second support portion (56) of said carrier (52), said first hook member (66) being nested in said cutout (68) and said end portion (70) being engaged with the second support portion (56) of said carrier (52).

4. The vehicle (10) as set forth in claim 3 wherein said rear slab member (50) has an upper end portion (72), and said first hook member (66) being connected to said upper end portion (72).

5. The vehicle (10) as set forth in claim 4 wherein said upper deck member (48) is mounted on the second support portion (56) of said carrier (52), and said first hook member (66) being captured between the cutout (68) and the upper deck member (48).

6. The vehicle (10) as set forth in claim 3 wherein said releasable connecting means (64) includes a second hook member (74) and a beam hook member (76), said second hook member (74) being engaged with said beam hook member (76).

7. The vehicle (10) as set forth in claim 6 wherein said beam hook member (76) includes a first plate portion (78) and a second plate portion (80), said first plate portion (78) being connected to said axle beam (32) and extending therefrom in a direction parallel to said longitudinal frame axis (22) and towards said rear slab member (50), said second plate portion (80) being connected to said first plate portion (78) and extending therefrom in a direction normal to and towards said longitudinal frame axis (22); and
   said second hook member (74) having an end portion (82), said end portion (82) being connected to said rear slab member (50) and extending therefrom in a direction normal to and away from said longitudinal frame axis (22).

8. The vehicle (10) as set forth in claim 7 wherein said rear slab member (50) has a lower end portion (84), and said second hook member (74) being connected to the lower end portion (84) of said rear slab member (50).

9. The vehicle (10) as set forth in claim 6 wherein said rear slab portion (50) includes;
   first and second fender portions (114,116) and a middle elongate portion (118), said middle elongate portion (118) being oriented substantially normally to the longitudinal frame axis (22) and extending in a passing relationship with said trunnion shaft (28);
   said axle beam (32) having opposite ends (40,42) and a wheel (26) mounted on each of said opposite ends (40,42), said first fender portion (40) being positioned in an overlying relationship with one of said wheels (26) and spaced a predetermined minimum distance ("D") therefrom, and said second fender portion (116) being positioned in an overlying relationship with the other of said wheels (26) and spaced a predetermined minimum distance ("D") therefrom;
   said rear slab portion (50) and said steering axle assembly (30) being pivotly movable with said carrier (52) about said trunnion shaft (28).

10. The vehicle (10) as set forth in claim 2 wherein said carrier (52) has a bore (58) disposed therethrough, said first support portion (54) having a first support surface (60) and said second support portion (56) having a second support surface (62), said first and second support surfaces (60,62) being oriented in oppositely facing directions and substantially parallel to one another, said bore (58) being positioned between said first and second support surfaces (60,62) and substantially parallel thereto.

11. The vehicle (10) as set forth in claim 10 wherein said trunnion shaft (28) has an end (110) and said carrier (52) has a first end (100) and a second end (106), including:
   a first bearing (96) rotatably mounted on said trunnion shaft (28) and securely mounted in the bore (58) of said carrier (52) adjacent the first end (100) thereof;
   a second bearing (102) rotatably mounted on said trunnion shaft (28) and securely mounted in the bore (58) of said carrier (52) adjacent the second end (106) thereof; and
   a retainer (108) connected to the end (110) of said trunnion shaft (28) and contactably engageable with said second bearing (102).

12. The vehicle (10) as set forth in claim 6 wherein said rear slab member (50) has an upper end (94), said upper deck member (48) being supported on the second support portion (56) and contactable with the upper end (94) of said rear slab member; said fastening means (86) includes:
   an aperture (90) disposed in said upper deck member (48);
   an aperture disposed in said second support portion (92); and
   a threaded fastener (88) disposed in the aperture (90) of said upper deck member and the aperture (92) in said second support portion (56).

13. A mounting arrangement (47) for connecting a counterweight (18) and a steering axle assembly (30) to a trunnion shaft (28) mounted on a frame (12) of a vehicle (10), said trunnion shaft (28) being positioned to lie along a longitudinal frame axis (22), comprising:
   a carrier (52) having first and second spaced apart opposite facing support portions (54,56) and a bore (58) disposed therein, said second support portion (56) having a cutout (68) disposed therein, said trunnion shaft (28) being disposed in said carrier bore (58) and said carrier (52) being pivotally movable thereon;
   said counterweight (18) having a rear slab member (50) and an upper deck member (48), said rear slab member (50) having an upper end (94), upper end portion (72) and a lower end portion (84);
   said steering axle assembly (30) having an axle beam (32) and a longitudinal beam axis (46) and being connected to said carrier first support portion (54), said beam axis (46) being oriented normal relative to the longitudinal frame axis (22);
   a first hook member (66) being connected to the upper end portion (72) of said rear slab member (50), a second hook member (74) being connected to the lower end portion (84) of said rear slab member (50), and a beam hook member (76) connected to said axle beam member (32), said first hook member (66) being positioned in the cutout (68) of said second support portion (56) and engageable with said second support portion, and said second hook member (74) being contactably engaged with said beam hook member (76);
   said upper deck member (48) being supported on said second support portion (56) and contactable with the upper end (94) of said rear slab member (50); and fastening means (86) for connecting said upper deck member (48) to said carrier second support portion (56) and retaining said upper deck member (48) in connection with said second support portion (56) and in contact with the upper end (94) of said rear slab member (50) and preventing disengagement of said first and second hook members (66,74) from engagement with said second support portion (56) and said beam hook member (76) respectively.

* * * * *